United States Patent
Ono et al.

(10) Patent No.: US 11,473,030 B2
(45) Date of Patent: Oct. 18, 2022

(54) LUBRICANT COMPOSITION

(71) Applicant: IDEMITSU KOSAN CO., LTD., Chiyoda-ku (JP)

(72) Inventors: Takuya Ono, Aachen (DE); Sho Yokoyama, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/055,367

(22) PCT Filed: May 14, 2019

(86) PCT No.: PCT/JP2019/019097
§ 371 (c)(1),
(2) Date: Nov. 13, 2020

(87) PCT Pub. No.: WO2019/221111
PCT Pub. Date: Nov. 21, 2019

(65) Prior Publication Data
US 2021/0214637 A1    Jul. 15, 2021

(30) Foreign Application Priority Data

May 18, 2018  (JP) .............................. JP2018-096651

(51) Int. Cl.
| | | |
|---|---|---|
| *C10M 111/04* | (2006.01) | |
| *C10M 101/02* | (2006.01) | |
| *C10M 105/38* | (2006.01) | |
| *C10M 107/10* | (2006.01) | |
| *C10M 111/02* | (2006.01) | |
| *C10M 143/02* | (2006.01) | |
| *C10M 143/04* | (2006.01) | |
| *C10N 20/02* | (2006.01) | |
| *C10N 30/02* | (2006.01) | |
| *C10N 40/04* | (2006.01) | |
| *C10N 20/00* | (2006.01) | |
| *C10N 30/10* | (2006.01) | |

(52) U.S. Cl.
CPC ......... *C10M 111/04* (2013.01); *C10M 101/02* (2013.01); *C10M 2203/1006* (2013.01); *C10M 2205/022* (2013.01); *C10M 2205/024* (2013.01); *C10M 2205/0285* (2013.01); *C10M 2207/026* (2013.01); *C10M 2207/2835* (2013.01); *C10M 2215/04* (2013.01); *C10M 2215/223* (2013.01); *C10M 2215/28* (2013.01); *C10M 2219/066* (2013.01); *C10M 2219/082* (2013.01); *C10M 2223/04* (2013.01); *C10N 2020/015* (2020.05); *C10N 2020/02* (2013.01); *C10N 2030/02* (2013.01); *C10N 2030/10* (2013.01); *C10N 2040/04* (2013.01)

(58) Field of Classification Search
CPC ............ C10M 101/02; C10M 105/38; C10M 107/10; C10M 111/02; C10M 111/04; C10M 143/02; C10M 143/04; C10M 2203/1006; C10M 2203/1025; C10M 2205/022; C10M 2205/024; C10M 2205/0285; C10M 2207/026; C10M 2207/2835; C10M 2209/084; C10M 2209/104; C10M 2215/02; C10M 2215/04; C10M 2215/064; C10M 2215/223; C10M 2215/28; C10M 2219/022; C10M 2219/066; C10M 2219/082; C10M 2223/04; C10M 2223/047; C10M 2229/02; C10N 2020/011; C10N 2020/015; C10N 2020/02; C10N 2030/02; C10N 2030/06; C10N 2030/10; C10N 2030/18; C10N 2030/52; C10N 2040/02; C10N 2040/04
See application file for complete search history.

(56) References Cited

U.S. PATENT DOCUMENTS

| | | | |
|---|---|---|---|
| 5,658,866 | A | 8/1997 | Yoshida et al. |
| 8,227,385 | B2 | 7/2012 | Tagawa et al. |
| 2007/0298990 | A1 | 12/2007 | Carey et al. |
| 2011/0049009 | A1 | 3/2011 | Tagawa et al. |
| 2011/0218131 | A1* | 9/2011 | Tsujimoto ............ C10M 171/02 508/382 |
| 2011/0237477 | A1* | 9/2011 | Tagawa .................. B01J 29/068 508/469 |

(Continued)

FOREIGN PATENT DOCUMENTS

| | | |
|---|---|---|
| CN | 101981166 A | 2/2011 |
| CN | 102292421 A | 12/2011 |

(Continued)

OTHER PUBLICATIONS

International Search Report dated Aug. 6, 2019 in PCT/JP2019/019097 filed on May 14, 2019, 2 pages.
Office Action dated Apr. 27, 2022, in Indian Patent Application No. 202047049848 (with English translation).
Office Action dated May 11, 2022, in Chinese Patent Application No. 201980032156.9.

(Continued)

*Primary Examiner* — James C Goloboy
(74) *Attorney, Agent, or Firm* — Oblon, McClelland, Maier & Neustadt, L.L.P.

(57) ABSTRACT

The present invention relates to a lubricating oil composition containing: (A) a poly-α-olefin base oil obtained by using a metallocene catalyst; (B) a mineral oil-based base oil exhibiting a distillation curve with a temperature gradient ΔIDtI of distillation temperature between two points 2.0 vol % and 5.0 vol % of distillation amount being 6.8° C./vol % or less; and (C) an ester-based base oil in an amount of 6% by mass or more based on a total amount of the composition.

20 Claims, No Drawings

(56) References Cited

U.S. PATENT DOCUMENTS

2011/0275867 A1    11/2011  Okada
2012/0322704 A1*   12/2012  Tamoto ................ C08F 110/14
                                                    508/421
2016/0257902 A1*    9/2016  Ono .................... C10M 169/04

FOREIGN PATENT DOCUMENTS

| CN | 102762702 A | 10/2012 |
| CN | 105368543 A | 3/2016 |
| CN | 105683344 A | 6/2016 |
| EP | 3 778 832 A1 | 2/2021 |
| JP | 2002-502436 A | 1/2002 |
| JP | 2004-182931 A | 7/2004 |
| JP | 2009-227942 A | 10/2009 |
| JP | 2009-235268 A | 10/2009 |
| JP | 2011-179018 A | 9/2011 |
| JP | 2015-86286 A | 5/2015 |
| JP | 2017-226793 A | 12/2017 |
| WO | WO 2008/038701 A1 | 4/2008 |
| WO | WO 2010/084966 A1 | 7/2010 |

OTHER PUBLICATIONS

Extended European Search Report dated May 23, 2022, in European Patent Application No. 19803116.3.
Office Action dated May 24, 2022, in Japanese Patent Application No. 2018-096651 (with computer generated English translation).

* cited by examiner

LUBRICANT COMPOSITION

TECHNICAL FIELD

The present invention relates to a lubricating oil composition.

BACKGROUND ART

Wind power generation, making use of renewable energy, is expected to increase in demand further in the future, from viewpoints of reduction of environment load and prevention of fossil fuel depletion in recent years.

In wind power generation using wind power, kinetic energy of wind is converted into power by using a propeller or a rotor which is rotated by wind. By using the power, a power generator is operated to produce electric energy.

In such wind power generation, since a rotation speed of the rotor is slow, a speed increaser is used in consideration of power generation efficiency of the power generator. Various speed increasers are known, and of those, a planetary gear-type power transmission apparatus is widely used.

A wind turbine gear oil composition for wind power generation for use in such a planetary gear-type power transmission apparatus or the like is required to be maintenance-free and operable over a long period of time.

As a lubricating oil composition for use in a speed increaser for wind power generation, PTL 1 discloses those containing a poly-α-olefin and a polyol ester in Examples.

Further, PTL 2 discloses a lubricating oil composition containing a poly-α-olefin, an ester-based base oil, and an ester-based anti-foaming agent for purpose of preventing foaming which occurs when the lubricating oil composition is used in a speed increaser for wind power generation.

CITATION LIST

Patent Literature

PTL 1: WO 2008/038701
PTL 2: JP 2015-86286 A

SUMMARY OF INVENTION

Technical Problem

However, when the lubricating oil composition described above is used as a wind turbine gear oil for wind power generation under a natural environment with a greater temperature change, a lubricating oil composition having a higher viscosity index, excellent oxidation stability and stable lubrication performance is required. Further, the lubricating oil composition as the wind turbine gear oil for wind power generation is required to have a high flash point as a property, from the viewpoint of safety.

The present invention has been made in view of the above requirements, and an object thereof is to provide a lubricating oil composition suitable as a wind turbine gear oil composition for wind power generation having excellent lubrication characteristics and oxidation stability while maintaining a high flash point.

Solution to Problem

As a result of intensive studies to develop a lubricating oil composition having the above-mentioned excellent performances, the present inventors have found that the above problems can be solved by a combination of (A) a poly-α-olefin base oil obtained using a metallocene catalyst, (B) a mineral oil-based base oil adjusted to exhibit a distillation curve with a temperature gradient of distillation temperature between two points 2.0 vol % and 5.0 vol % of distillation amount being a predetermined value or less, and (C) an ester-based base oil in a specific amount or more. The present invention has been completed based on such findings.

That is, the present invention provides the following [1] to [18]. [1] A lubricating oil composition, containing: (A) a poly-α-olefin base oil obtained by using a metallocene catalyst; (B) a mineral oil-based base oil exhibiting a distillation curve with a temperature gradient Δ|Dt| of distillation temperature between two points 2.0 vol % and 5.0 vol % of distillation amount being 6.8° C./vol % or less; and (C) an ester-based base oil in an amount of 6% by mass or more based on a total amount of the composition.

[2] The lubricating oil composition according to the above [1], wherein a total amount of the component (A) and the component (B) is 75% by mass or more based on the total amount of the composition.

[3] The lubricating oil composition according to the above [1] or [2], wherein a content of the component (A) is 40% by mass or more and 75% by mass or less based on the total amount of the composition.

[4] The lubricating oil composition according to any one of the above [1] to [3], wherein a content of the component (C) is 6% by mass or more and 15% by mass or less based on the total amount of the composition.

[5] The lubricating oil composition according to any one of the above [1] to [4], wherein a 40° C. kinematic viscosity of the component (A) is 1,300 mm$^2$/s or more.

[6] The lubricating oil composition according to any one of the above [1] to [5], wherein the component (A) is a polymer of an α-olefin having 8 to 12 carbon atoms.

[7] The lubricating oil composition according to the above [6], wherein the component (A) is a decene oligomer.

[8] The lubricating oil composition according to any one of the above [1] to [7], wherein the component (C) is a polyol ester.

[9] The lubricating oil composition according to any one of the above [1] to [8], further containing: an olefin copolymer as a viscosity index improver.

[10] The lubricating oil composition according to the above [9], wherein a content of the olefin copolymer is 1% by mass to 10% by mass based on the total amount of the composition.

[11] The lubricating oil composition according to any one of the above [1] to [10], which has a flash point of 242° C. or higher.

[12] The lubricating oil composition according to any one of the above [1] to [11], which is a wind turbine gear oil composition for wind power generation.

[13] A method of producing the lubricating oil composition according to any one of the above [1] to [12], the method including: blending at least (A) the poly-α-olefin base oil obtained by using the metallocene catalyst, (B) the mineral oil-based base oil exhibiting the distillation curve with the temperature gradient Δ|Dt| of distillation temperature between the two points 2.0 vol % and 5.0 vol % of distillation amount being 6.8° C./vol % or less, and (C) the ester-based base oil in an amount 6% by mass or more based on the total amount of the composition.

[14] A lubrication method, including: lubricating a planetary gear-type power transmission apparatus by using the lubricating oil composition according to any one of the above [1] to [12].

[15] The lubrication method according to the above [14], wherein the planetary gear-type power transmission apparatus is used in a wind power generator.

[16] A planetary gear-type power transmission apparatus, which uses the lubricating oil composition according to any one of the above [1] to [12].

[17] A wind power generator, which uses the planetary gear-type power transmission apparatus according to the above [16].

[18] A speed increaser for wind power generation, which uses the lubricating oil composition according to any one of the above [1] to [12].

Advantageous Effects of Invention

According to the present invention, it is possible to provide a lubricating oil composition suitable as a wind turbine gear oil composition for wind power generation having excellent lubrication characteristics and oxidation stability while maintaining a high flash point.

DESCRIPTION OF EMBODIMENTS

[Lubricating Oil Composition]

A lubricating oil composition according to an embodiment of the present invention contains (A) a poly-α-olefin base oil (hereinafter, also referred to as "component (A)") obtained by using a metallocene catalyst, (B) a mineral oil-based base oil (hereinafter, also referred to as "component (B)") exhibiting a distillation curve with a temperature gradient Δ|Dt| of distillation temperature between two points 2.0 vol % and 5.0 vol % of distillation amount being 6.8° C./vol % or less, and (C) an ester-based base oil (hereinafter, also referred to as "component (C)") in an amount of 6% by mass or more based on a total amount of the composition. Hereinafter, the present invention will be described in detail with reference to embodiments.

In the present description, for a preferred numerical range (for example, a range of a characteristic value or a content), a lower limit value and an upper limit value described in stages may be independently combined. For example, from a description of the lower limit value and the upper limit value of "preferably 10 or more and 90 or less, more preferably 20 or more and 80 or less, and still more preferably 30 or more and 60 or less" for a corresponding numerical range, it is also possible to combine a "preferred lower limit value (10)" and a "more preferred upper limit value (60)" to make a suitable range "10 or more and 60 or less". Similarly, it is also possible to combine a "preferred lower limit value (30)" and a "more preferred upper limit value (90)" to make a suitable range "30 or more and 90 or less". The same applies to a case where the preferred lower limit value and the preferred upper limit value are described independently.

Similarly, for example, from the description of "preferably 10 to 90, more preferably 20 to 80, and still more preferably 30 to 60", "10 to 60" may be used.

Unless otherwise specified, when simply describing "10 to 90" as the preferred numerical range, it means a range of 10 or more and 90 or less.

Hereinafter, each component contained in the lubricating oil composition according to the present embodiment will be described.

<(A) Poly-α-Olefin Base Oil Obtained by Using Metallocene Catalyst>

In the lubricating oil composition according to the present embodiment, as the component (A), a poly-α-olefin (hereinafter, also referred to as "mPAO") base oil obtained by using a metallocene catalyst is used. By using the mPAO base oil, a lubricating oil excellent in fatigue resistance can be obtained, and a viscosity index is high, so that a low-temperature viscosity characteristic can be improved.

A kinematic viscosity at 40° C. (hereinafter, also referred to as "40° C. kinematic viscosity") of the mPAO base oil for use in the present embodiment is preferably 1,100 mm$^2$/s or more, more preferably 1,200 mm$^2$/s or more, and still more preferably 1,300 mm$^2$/s or more. By setting the 40° C. kinematic viscosity of the mPAO base oil to 1,100 mm$^2$/s or more, the viscosity index can be maintained high, and foaming of the lubricating oil composition can be prevented. The upper limit value of the 40° C. kinematic viscosity of the mPAO base oil is preferably 2,000 mm$^2$/s.

A kinematic viscosity at 100° C. (hereinafter, also referred to as "100° C. kinematic viscosity") of the mPAO base oil for use in the present embodiment is preferably 110 mm$^2$/s or more, more preferably 120 mm$^2$/s or more, and still more preferably 130 mm$^2$/s or more. By setting the 100° C. kinematic viscosity of the mPAO base oil to 110 mm$^2$/s or more, the viscosity index can be maintained high, and the foaming of the lubricating oil composition can be prevented. The upper limit value of the 100° C. kinematic viscosity of the mPAO base oil is preferably 200 mm$^2$/s.

The viscosity index of the mPAO base oil is preferably 100 or more and 300 or less, more preferably 150 or more and 250 or less, and still more preferably 170 or more and 250 or less. When the viscosity index of the mPAO base oil is within the above range, the viscosity index of the lubricating oil composition is also high and the low-temperature viscosity characteristic is improved. A plurality of the above mPAO having different viscosity characteristics may be mixed and used.

That is, in the lubricating oil composition according to the present embodiment, one type of the component (A) may be used alone, or two or more types of the component (A) may be used in combination.

The mPAO base oil which is the component (A) preferably has a pour point of −25° C. or lower. The pour point of the component (A) being −25° C. or lower is preferred since the lubricating oil composition containing the component (A) has sufficient fluidity even in a low-temperature environment. The pour point of the mPAO base oil is more preferably −30° C. or lower, and still more preferably −35° C. or lower.

The kinematic viscosity and the viscosity index are values measured in accordance with JIS K 2283:2000, and the pour point is a value measured in accordance with JIS K 2269: 1987.

A content of the component (A) in the lubricating oil composition according to the present embodiment is preferably 40% by mass or more and 75% by mass or less, more preferably 45% by mass or more and 72% by mass or less, and still more preferably 50% by mass or more and 70% by mass or less based on the total amount of the lubricating oil composition. When the content of the component (A) is 40% by mass or more and 75% by mass or less, the kinematic viscosity of the lubricating oil composition can be maintained high, and high seizure resistance required for a wind turbine gear oil for wind power generation can be obtained.

The mPAO base oil used as the component (A) is preferably a poly-α-olefin obtained by using one type of α-olefin having 8 to 12 carbon atoms alone or a combination of two or more types of α-olefin having 8 to 12 carbon atoms, as a raw material, to produce (polymerize) the above α-olefin(s) in the presence of a metallocene catalyst, or a hydride thereof.

The α-olefin having 8 to 12 carbon atoms as the raw material may be linear or branched, but a linear α-olefin is preferably used, and examples thereof include 1-octene, 1-nonene, 1-decene, 1-undecene, and 1-dodecene.

The component (A) is preferably a polymer of an α-olefin having 8 to 12 carbon atoms, and more preferably a decene oligomer obtained by polymerization using 1-decene as a raw material.

As the metallocene catalyst which is a polymerization catalyst for use in production of the mPAO base oil, a complex having a conjugated carbon 5-membered ring containing a Group 4 element in the periodic table, that is, a combination of a metallocene complex and an oxygen-containing organic aluminum compound may be used.

As the Group 4 element in the periodic table in the metallocene complex, titanium, zirconium, and hafnium are used, and zirconium is preferred. As the complex having a conjugated carbon 5-membered ring, a complex having a substituted or unsubstituted cyclopentadienyl ligand is generally used.

Examples of suitable metallocene complex include bis(n-octadecylcyclopentadienyl)zirconium dichloride, bis(trimethylsilylcyclopentadienyl)zirconium dichloride, bis(tetrahydroindenyl)zirconium dichloride, bis[(t-butyldimethylsilyl)cyclopentadienyl]zirconium dichloride, bis(di-t-butylcyclopentadienyl)zirconium dichloride, (ethylidene-bisindenyl)zirconium dichloride, biscyclopentadienyl zirconium dichloride, ethylidene bis(tetrahydroindenyl)zirconium dichloride, and bis[3,3-(2-methyl-benzindenyl)]dimethylsilanediylzirconium dichloride. One of these may be used alone, or two or more of these may be used in combination.

On the other hand, examples of the oxygen-containing organic aluminum compound include methylaluminoxane, ethylaluminoxane, and isobutylaluminoxane. One of these may be used alone, or two or more of these may be used in combination.

The mPAO base oil for use in the present invention, that is, the mPAO produced by using the metallocene catalyst has a higher viscosity index than a PAO produced by using a non-metallocene catalyst (ziegler catalyst or the like), thus increasing the viscosity index of the lubricating oil composition.

<(B) Mineral Oil-Based Base Oil>

The component (B) is a mineral oil-based base oil satisfying a requirement of "the distillation curve with the temperature gradient Δ|Dt| of distillation temperature between the two points 2.0 vol % and 5.0 vol % of distillation amount being 6.8° C./vol % or less".

That is, the temperature gradient defined in the above requirement is a parameter considering a relationship between a state of the mineral oil-based base oil, such as a content of a light component that cannot be removed even in a purification step and a structure of a wax component, and a flash point when the mineral oil-based base oil is used as the wind turbine gear oil for wind power generation.

In the distillation curve of the mineral oil-based base oil, a behavior of the distillation curve varies around an initial boiling point where the distillation amount is less than 2 vol %, and it is difficult to accurately evaluate the state of the mineral oil. In addition, when the distillation amount is 10 vol % to 20 vol %, a variation of the distillation curve is stabilized, but a distillation point reaches a temperature at which the light component is discharged, making the state of the mineral oil-based base oil not accurately evaluated.

In contrast, in the present embodiment, it is focused on the temperature gradient Δ|Dt| of distillation temperature between the two points 2.0 vol % and 5.0 vol % of distillation amount in the distillation curve of the mineral oil-based base oil, as defined in the above requirement. When the distillation amount is 2.0 vol % to 5.0 vol %, the variation of the distillation curve is stabilized and the temperature therebetween is a temperature region where the light component also remains, so that the state of the light component and the wax component of the mineral oil-based base oil can be accurately evaluated.

According to the investigation of the present inventors, it is found that the mineral oil-based base oil prepared to exhibit a distillation curve with a temperature gradient Δ|Dt| of distillation temperature between the two points 2.0 vol % and 5.0 vol % of distillation amount being 6.8° C./vol % or less as defined in the above requirement is applicable for preparing a wind turbine gear oil for wind power generation having a flash point higher than that of a mineral oil-based base oil in the related art.

It is considered that the mineral oil-based base oil satisfying the above requirement exhibits such effects because the influence of the light component on the flash point of the lubricating oil composition is reduced and even when the light component is contained in a few amount, an adverse influence of the light component on the flash point (decrease in the flash point) is prevented by the wax component in the mineral oil-based base oil.

It is also found that the mineral oil-based base oil satisfying the above requirement can effectively prevent sludge generation or the like when blending with an antioxidant, such as a phenol-based compound or an amine-based compound, to be used as a lubricating oil.

Therefore, even when the component (B) further contains an antioxidant, a decrease in durability due to the sludge generation or the like can be prevented, and a wind turbine gear oil for wind power generation having further improved oxidation stability can be produced.

With respect to the component (B), from the viewpoint of obtaining the wind turbine gear oil for wind power generation having a high flash point, the temperature gradient Δ|Dt| defined in the above requirement is preferably 6.5° C./vol % or less, more preferably 6.3° C./vol % or less, still more preferably 6.0° C./vol % or less, and yet still more preferably 5.0° C./vol % or less.

In addition, the temperature gradient Δ|Dt| defined in the above requirement is preferably 0.1° C./vol % or more.

In the present description, the temperature gradient Δ|Dt| defined in the above requirement means a value calculated from the following formula.

$$\text{Temperature gradient } \Delta|Dt|(° \text{C./vol \%}) = |[\text{distillation temperature } (° \text{C.}) \text{ at which distillation amount of mineral oil-based base oil is 5.0 vol \%}] - [\text{distillation temperature } (° \text{C.}) \text{ at which distillation amount of mineral oil-based base oil is 2.0 vol \%}]|/3.0 \text{ (vol \%)}$$

The "distillation temperature at which distillation amount of mineral oil-based base oil is 5.0 vol % or 2.0 vol %" in the above formula is a value measured by a method in conformity with ASTM D6352, specifically means a value measured by a method described in Examples.

The distillation temperature at which the distillation amount of the component (B) is 2.0 vol % is preferably 405°

C. to 510° C., more preferably 410° C. to 500° C., still more preferably 415° C. to 490° C., and yet still more preferably 430° C. to 480° C.

The distillation temperature at which the distillation amount of the component (B) is 5.0 vol % is preferably 425° C. to 550° C., more preferably 430° C. to 520° C., still more preferably 434° C. to 500° C., and yet still more preferably 450° C. to 490° C.

Examples of the mineral oil-based base oil include: a base oil obtained by subjecting an atmospheric residue obtained by atmospheric distillation of a crude oil, such as a paraffinic crude oil, an intermediate crude oil, and a naphthenic crude oil or a wax synthesized by using a component derived from a natural gas, or the like to at least one purification process such as at least distillation process including atmospheric distillation or vacuum distillation, a solvent deasphalting process, at least one process including solvent extraction, hydrofinishing, or hydrocracking, and at least one process including solvent dewaxing, catalytic dewaxing, or hydroisomerization dewaxing; and a base oil obtained by subjecting the wax obtained during the production of the base oil to at least one of the above purification processes.

The mineral oil-based base oil according to the present embodiment does not contain a poly-α-olefin base oil and an ester-based base oil (herein, "the poly-α-olefin" includes both a poly-α-olefin obtained using a general catalyst and the poly-α-olefin obtained using a metallocene catalyst).

A paraffin content (% $C_P$) of the component (B) is preferably 50 or more, more preferably 55 or more, still more preferably 60 or more, yet still more preferably 65 or more, and even still more preferably 70 or more, and is preferably 99 or less.

In the present specification, the paraffin content (% $C_P$) means a value measured in conformity with ASTM D-3238 ring analysis (n-d-M method).

The component (B) satisfying the above requirement may be prepared by appropriately considering the following matters. The following matters merely represent an example of the preparation method, and it is also possible to prepare the mineral oil-based base oil by considering matters other than the following matters.

The number of stages of a distillation column and a reflux flow rate when distilling a feedstock oil are appropriately adjusted.

The feedstock oil is distilled at a distillation temperature at which the 5 vol % fraction of the distillation curve is 425° C. or higher, and a fraction having a viscosity grade ranging from VG22 to VG100 is collected.

Preferably, the feedstock oil is subjected to a purification process including a hydrogenation isomerization dewaxing step, and more preferably, the feedstock oil is subjected to a purification process including a hydrogenation isomerization dewaxing step and a hydrofinishing step.

A supply proportion of the hydrogen gas in the hydrogenation isomerization dewaxing step is preferably 200 Nm$^3$ to 500 Nm$^3$, more preferably 250 Nm$^3$ to 450 Nm$^3$, and still more preferably 300 Nm$^3$ to 400 Nm$^3$ per kiloliter of the feedstock oil to be supplied.

A hydrogen partial pressure in the hydrogenation isomerization dewaxing step is preferably 5 MPa to 25 MPa, more preferably 7 MPa to 20 MPa, and still more preferably 10 MPa to 15 MPa.

A liquid hourly space velocity (LHSV) in the hydrogenation isomerization dewaxing step is preferably 0.2 hr$^{-1}$ to 2.0 hr$^{-1}$, more preferably 0.3 hr$^{-1}$ to 1.5 hr$^{-1}$, and still more preferably 0.5 hr$^{-1}$ to 1.0 hr$^{-1}$.

A reaction temperature in the hydrogenation isomerization dewaxing step is preferably 250° C. to 450° C., more preferably 270° C. to 400° C., and still more preferably 300° C. to 350° C.

The 40° C. kinematic viscosity of the component (B) is preferably 5.0 mm$^2$/s to 110 mm$^2$/s, more preferably 6.0 mm$^2$/s to 90.0 mm$^2$/s, still more preferably 7.0 mm$^2$/s to 80.0 mm$^2$/s, and yet still more preferably 8.0 mm$^2$/s to 75.0 mm$^2$/s.

The viscosity index of the component (B) is preferably 80 or more, more preferably 90 or more, still more preferably 100 or more, yet still more preferably 110 or more, and even yet still more preferably 120 or more. The upper limit value thereof is not particularly limited, and is, for example, 200.

In the lubricating oil composition according to the present embodiment, the component (B) may be used either alone or in combination of two or more thereof.

The content of the component (B) in the lubricating oil composition according to the present embodiment is preferably 10% by mass or more and 60% by mass or less, more preferably 15% by mass or more and 55% by mass or less, and still more preferably 20% by mass or more and 50% by mass or less based on the total amount of the lubricating oil composition. When the content of the component (B) is 10% by mass or more and 60% by mass or less, acid value stability of the lubricating oil composition is excellent, and foaming prevention effect is also improved.

<(C) Ester-Based Base Oil>

As the ester-based base oil which is the component (C), a polyol ester is preferably used. The polyol ester may be either a partial ester of a polyol or a complete ester of a polyol, and the use of a partial ester of a polyol is preferred from the viewpoint of sludge solubility.

The polyol serving as a raw material of the polyol ester is not particularly limited, and is preferably an aliphatic polyol. Examples of the polyol include dihydric alcohols, such as ethylene glycol, diethylene glycol, triethylene glycol, propylene glycol, trimethylene glycol, tetramethylene glycol, and neopentyl glycol; trihydric alcohols, such as glycerin, trimethylolethane, and trimethylolpropane; and tetrahydric or polyhydric alcohols, such as diglycerin, triglycerin, pentaerythritol, dipentaerythritol, mannite, and sorbit.

A hydrocarbyl group constituting the polyol ester is preferably an alkyl group or an alkenyl group having 6 to 30 carbon atoms, and more preferably an alkyl group or an alkenyl group having 12 to 24 carbon atoms. Examples thereof include various hexyl groups, octyl groups, decyl groups, dodecyl groups, tetradecyl groups, hexadecyl groups, heptadecyl groups, octadecyl groups, hexenyl groups, octenyl groups, decenyl groups, dodecenyl groups, tetradecenyl groups, hexadecenyl groups, and octadecenyl groups.

The alkyl group or alkenyl group may be linear or branched.

Specific examples of the complete ester of polyol include, but are not limited to, neopentyl glycol dilaurate, neopentyl glycol dimyristate, neopentyl glycol dipalmitate, neopentyl glycol distearate, neopentyl glycol diisostearate, trimethylolpropane trilaurate, trimethylolpropane trimyristate, trimethylolpropane tripalmitate, trimethylolpropane tristearate, trimethylolpropane triisostearate, glycerin trilaurate, glycerin tristearate, and glycerin triisostearate.

The partial ester of polyol is not particularly limited so long as at least one hydroxy group remains.

Specific examples of the partial ester of polyol include, but are not limited to, neopentyl glycol monolaurate, neopentyl glycol monomyristate, neopentyl glycol monopalmitate, neopentyl glycol monostearate, neopentyl glycol monoisostearate, trimethylolpropane mono- or di-laurate, trimethylolpropane mono- or di-myristate, trimethylolpropane mono- or di-palmitate, trimethylolpropane mono- or di-stearate, trimethylolpropane mono- or di-isostearate, glycerin mono- or di-laurate, glycerin mono- or di-stearate, and glycerin mono- or di-isostearate.

In the lubricating oil composition according to the present embodiment, the content of the component (C) is 6% by mass or more based on the total amount of the composition. When the content of the component (C) is less than 6% by mass, sufficient sludge solubility and sufficient additive solubility cannot be obtained. The content of the component (C) is preferably 6% by mass or more and 15% by mass or less, more preferably 6% by mass or more and 13% by mass or less, and still more preferably 6% by mass or more and 11% by mass or less based on the total amount of the lubricating oil composition. The component (C) may be used either alone or in combination of two or more thereof.

In the lubricating oil composition according to the present invention, a total amount of the component (A) and the component (B) is preferably 75% by mass or more, more preferably 78% by mass or more, still more preferably 80% by mass or more, and is 94% by mass or less, preferably 90% by mass or less, more preferably 87% by mass or less, and still more preferably 85% by mass or less, based on the total amount of the lubricating oil composition.

As the base oil for use in the lubricating oil composition according to the present invention, the total amount of the component (A), the component (B), and the component (C) is preferably 90% by mass or more, more preferably 95% by mass or more, still more preferably 98% by mass or more, yet still more preferably 99% by mass or more, and even still more preferably 100% by mass based on a total mass of the base oil.

<Other Base Oil>

The lubricating oil composition according to the present embodiment may contain a base oil other than the component (A), the component (B) and the component (C), and a content of the other base oil is preferably 20% by mass or less, more preferably 15% by mass or less, and still more preferably 10% by mass or less based on the total amount of the lubricating oil composition.

The type of the other base oil is not particularly limited, and either a mineral oil or a synthetic oil may be used. Here, as the mineral oil, various known mineral oils in the related art may be used, and examples thereof include a paraffin-based mineral oil, an intermediate mineral oil, and a naphthene-based mineral oil. Specific examples thereof include a solvent-refined or hydrogenated light neutral oil, a medium neutral oil, a heavy neutral oil, and a bright stock.

As the synthetic oil, various synthetic oils in the related art may be used. For example, polybutene, phosphate esters, polyphenyl ethers, alkylbenzenes, alkylnaphthalenes, polyoxyalkylene glycols, neopentyl glycol, silicone oils, trimethylolpropane, pentaerythritol, and hindered esters may be used. These base oils may be used either alone or in combination of two or more thereof, and the mineral oil and the synthetic oil may be used in combination.

As described above, the lubricating oil composition according to the present embodiment may contain a base oil other than the component (A), the component (B), and the component (C), but it is even more preferable not to contain the base oil other than the component (A), the component (B) and the component (C) as the base oil.

<(D) Sulfur Compound>

The lubricating oil composition according to the present embodiment may further contain a sulfur compound as a component (D).

Specific examples of the sulfur compound which is the component (D) include (d-1) a sulfur compound having an S content in a molecule of 15% by mass or more, and (d-2) trihydrocarbyl thiophosphates represented by the following general formula (I).

$$(R-O-)_3 P=S \qquad (I)$$

(In the formula, R represents a hydrocarbyl group having 6 to 20 carbon atoms.)

Examples of the sulfur compound serving as the component (d-1) include the following compounds.
(1) Sulfurized olefin
(2) Dihydrocarbyl sulfide
(3) Thiadiazole compound
(4) Dithiocarbamate compound
(5) Ester compounds having disulfide structure
(6) Other sulfur compounds
(Sulfurized Olefin)

Examples of the sulfurized olefin include a compound represented by the following general formula (III).

$$R^1-S_a-R^2 \qquad (III)$$

(In the formula, $R^1$ represents an alkenyl group having 2 to 15 carbon atoms, $R^2$ represents an alkyl group or an alkenyl group having 2 to 15 carbon atoms, and a represents an integer of 1 to 3.)

Such a compound is obtained through a reaction between an olefin having 2 to 15 carbon atoms or a dimer to tetramer thereof and a sulfidizing agent such as sulfur and sulfur chloride, and the olefin is preferably propylene, isobutene, diisobutene, or the like.

(Dihydrocarbyl Mono-, Di- or Tri-Sulfide)

Examples of dihydrocarbyl monosulfide, dihydrocarbyl disulfide or dihydrocarbyl trisulfide include a compound represented by the following general formula (IV).

$$R^3-S_b-R^4 \qquad (IV)$$

(In the formula, $R^3$ and $R^4$, which may be identical to or different from each other, each represent an alkyl group or a cyclic alkyl group having 1 to 20 carbon atoms, an aryl group having 6 to 20 carbon atoms, an alkylaryl group having 7 to 20 carbon atoms, or an arylalkyl group having 7 to 20 carbon atoms, and b represents 1 to 3.)

Here, when $R^3$ and $R^4$ are each an alkyl group, the compound represented by the above general formula (IV) is called an alkyl sulfide.

Preferred examples of the dihydrocarbyl mono- or di-sulfide represented by the above general formula (IV) include dibenzyl mono-, di- or tri-sulfide, various dinonyl mono-, di- or tri-sulfides, various didodecyl mono-, di- or tri-sulfides, various dibutyl mono-, di- or tri-sulfides, various dioctyl mono-, di- or tri-sulfides, diphenyl mono-, di- or tri-sulfide, and dicyclohexyl mono-, di- or tri-sulfide.

(Thiadiazole Compound)

Preferred examples of the thiadiazole compound include 2,5-bis(n-hexyldithio)-1,3,4-thiadiazole, 2,5-bis(n-octyldithio)-1,3,4-thiadiazole, 2,5-bis(n-nonyldithio)-1,3,4-thiadiazole, 2,5-bis(1,1,3,3-tetramethylbutyldithio)-1,3,4 thiadiazole, 3,5-bis(n-hexyldithio)-1,2,4-thiadiazole, 3,5-bis(n-octyldithio)-1,2,4-thiadiazole, 3,5-bis(n-nonyldithio)-1,2,4-thiadiazole, 3,5-bis(1,1,3,3-tetramethylbutyldithio)-1,2,4-thiadiazole, 4,5-bis(n-octyldithio)-1,2,3-thiadiazole, 4,5-bis (n-nonyldithio)-1,2,3-thiadiazole, and 4,5-bis(1,1,3,3-tetramethylbutyldithio)-1,2,3-thiadiazole.

(Dithiocarbamate Compound)

Examples of the dithiocarbamate compound include an alkylene bis(dialkyklithiocarbamate). Of those, a dithiocarbamate compound having an alkylene group having 1 to 3 carbon atoms, a linear or branched saturated or unsaturated alkyl group having 3 to 20 carbon atoms, or a cyclic alkyl group having 6 to 20 carbon atoms is preferably used. Specific examples of such a dithiocarbamate compound include methylene bis(dibutyldithiocarbamate), methylene bis(dioctyldithiocarbamate), and methylene bis(tridecyldithiocarbamate).

(Ester Compound Having Disulfide Structure)

As the ester compound having a disulfide structure, a disulfide compound represented by a general formula (V) and a disulfide compound represented by a general formula (VI) are used.

$$R^5OOC-A^1-S-S-A^2-COOR^6 \quad (V)$$

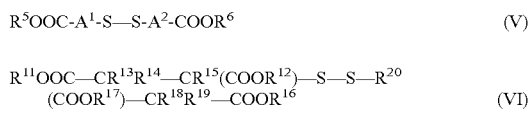

In the general formula (V), $R^5$ and $R^6$ are each independently a hydrocarbyl group having 1 to 30 carbon atoms, preferably a hydrocarbyl group having 1 to 20 carbon atoms, more preferably a hydrocarbyl group having 2 to 18 carbon atoms, and still more preferably a hydrocarbyl group having 3 to 18 carbon atoms. The hydrocarbyl group may be linear, branched, or cyclic and may contain an oxygen atom, a sulfur atom, or a nitrogen atom. $R^5$ and $R^6$ may be identical to or different from each other, and $R^5$ and $R^6$ are preferably identical to each other from the viewpoint of production.

$A^1$ and $A^2$ are each independently a group represented by $CR^7R^8$ or $CR^7R^8-CR^9R^{10}$, wherein $R^7$ to $R^{10}$ are each independently a hydrogen atom or a hydrocarbyl group having 1 to 20 carbon atoms. The hydrocarbyl group is preferably a hydrocarbyl group having 1 to 12 carbon atoms, and more preferably a hydrocarbyl group having 1 to 8 carbon atoms. In addition, $A^1$ and $A^2$ may be identical to or different from each other, and $A^1$ and $A^2$ are preferably identical to each other from the viewpoint of production.

Meanwhile, in the general formula (VI), $R^{11}$, $R^{12}$, $R^{16}$, and $R^{17}$ are each independently a hydrocarbyl group having 1 to 30 carbon atoms, preferably a hydrocarbyl group having 1 to 20 carbon atoms, more preferably a hydrocarbyl group having 2 to 18 carbon atoms, and still more preferably a hydrocarbyl group having 3 to 18 carbon atoms. The hydrocarbyl group may be linear, branched, or cyclic and may contain an oxygen atom, a sulfur atom, or a nitrogen atom. $R^{11}$, $R^{12}$, $R^{16}$, and $R^{17}$ may be identical to or different from each other, and $R^{11}$, $R^{12}$, $R^{16}$, and $R^{17}$ are preferably identical to each other from the viewpoint of production.

$R^{13}$ to $R^{15}$ and $R^{18}$ to $R^{20}$ are each independently a hydrogen atom or a hydrocarbyl group having 1 to 5 carbon atoms. $R^{13}$ to $R^{15}$ and $R^{18}$ to $R^{20}$ are each preferably a hydrogen atom from the viewpoint of easiness of availability of raw materials.

Specific examples of the disulfide compound represented by the above general formula (V) include bis(methoxycarbonylmethyl) disulfide, bis(ethoxycarbonylmethyl) disulfide, bis(n-propoxycarbonylmethyl) disulfide, bis(isopropoxycarbonylmethyl) disulfide, bis(cyclopropoxycarbonylmethyl) disulfide, 1,1-bis(1-methoxycarbonylethyl) disulfide, 1,1-bis(1-methoxycarbonyl-n-propyl) disulfide, 1,1-bis(1-methoxycarbonyl-n-butyl) disulfide, 1,1-bis(1-methoxycarbonyl-n-hexyl) disulfide, 1,1-bis(1-methoxycarbonyl-n-octyl) disulfide, 2,2-bis(2-methoxycarbonyl-n-propyl) disulfide, α,α-bis(α-methoxycarbonylbenzyl) disulfide, 1,1-bis(2-methoxycarbonylethyl) disulfide, 1,1-bis(2-ethoxycarbonylethyl) disulfide, 1,1-bis(2-n-propoxycarbonylethyl) disulfide, 1,1-bis(2-isopropoxycarbonylethyl) disulfide, 1,1-bis(2-cyclopropoxycarbonylethyl) disulfide, 1,1-bis(2-methoxycarbonyl-n-propyl) disulfide, 1,1-bis(2-methoxycarbonyl-n-butyl) disulfide, 1,1-bis(2-methoxycarbonyl-n-hexyl) disulfide, 1,1-bis(2-methoxycarbonyl-n-propyl) disulfide, 2,2-bis(3-methoxycarbonyl-n-pentyl) disulfide, and 1,1-bis(2-methoxycarbonyl-1-phenylethyl) disulfide.

Specific examples of the disulfide compound represented by the above general formula (VI) include tetramethyl dithiomalate, tetraethyl dithiomalate, tetra-1-propyl dithiomalate, tetra-2-propyl dithiomalate, tetra-1-butyl dithiomalate, tetra-2-butyl dithiomalate, tetraisobutyl dithiomalate, tetra-1-hexyl dithiomalate, tetra-1-octyl dithiomalate, tetra-1-(2-ethyl)hexyl dithiomalate, tetra-1-(3,5,5-trimethyl)hexyl dithiomalate, tetra-1-decyl dithiomalate, tetra-1-dodecyl dithiomalate, tetra-1-hexadecyl dithiomalate, tetra-1-octadecyl dithiomalate, tetrabenzyl dithiomalate, tetra-α-(methyl)benzyl dithiomalate, tetra-α,α-dimethylbenzyl dithiomalate, tetra-1-(2-methoxy)ethyl dithiomalate, tetra-1-(2-ethoxy)ethyl dithiomalate, tetra-1-(2-butoxy)ethyl dithiomalate, tetra-1-(2-ethoxy)ethyl dithiomalate, tetra-1-(2-butoxy-butoxy)ethyl dithiomalate, and tetra-1-(2-phenoxy)ethyl dithiomalate.

(Other Sulfur Compounds)

Examples of other sulfur compounds include: sulfurized oils and fats, such as sulfidized lard, sulfidized rape seed oil, sulfidized castor oil, sulfidized soy bean oil, and sulfidized rice bran oil; sulfidized fatty acids, such as thioglycolic acid and oleic acid sulfide; dialkyl thiodipropionate compounds, such as dilauryl thiodipropionate, distearyl thiodipropionate, and dimyristyl thiodipropionate; and thioterpene compounds obtained by a reaction between phosphorus pentasulfide and pinene.

In the lubricating oil composition according to the present embodiment, the sulfur compound may be used either alone or in combination of two or more thereof as the sulfur compound serving as the component (d-1). As for a blending amount of the component (d-1), the sulfur compound is contained in an amount of, in terms of a sulfur atom, preferably 0.2% by mass to 0.7% by mass, more preferably 0.3% by mass to 0.6% by mass, and still more preferably 0.4% by mass to 0.5% by mass based on the total amount of the lubricating oil composition. When the sulfur atom content is 0.2% by mass or more, the seizure resistance is improved. On the other hand, when the sulfur atom content is 0.7% by mass or less, not only the fatigue resistance is improved, but also the sludge generation is prevented.

If desired, the lubricating oil composition according to the present embodiment may contain trihydrocarbyl thiophosphates represented by the general formula (I) as the component (d-2).

$$(R-O)_3P=S \quad (I)$$

In the general formula (I), R represents a hydrocarbyl group having 6 to 20 carbon atoms. Examples of the hydrocarbyl group include a linear, branched, or cyclic alkyl group or alkenyl group having 6 to 20 carbon atoms, an aryl group having 6 to 20 carbon atoms, or an aralkyl group having 7 to 20 carbon atoms. In the aryl group and aralkyl group, one or more alkyl groups may be introduced onto the aromatic ring. Three R—O— groups may be identical to or different from each other.

Examples of the alkyl group and the alkenyl group each having 6 to 20 carbon atoms include various hexyl groups, various octyl groups, various decyl groups, various dodecyl groups, various tetradecyl groups, various hexadecyl groups, various octadecyl groups, a cyclohexyl group, various hexenyl groups, various octenyl groups, various decenyl groups, various dodecenyl groups, various tetradecenyl groups, various hexadecenyl groups, various octadecenyl groups, and cyclohexenyl groups.

Examples of the aryl group having 6 to 20 carbon atoms include a phenyl group, a tolyl group, a xylyl group, a decylphenyl group, a 2,4-didecylphenyl group, and a naphthyl group. Examples of the aralkyl group having 7 to 20 carbon atoms include a benzyl group, a phenethyl group, a naphthylmethyl group, a methylbenzyl group, a methylphenethyl group, and a methylnaphthylmethyl group.

Specific examples of the trihydrocarbyl thiophosphates represented by the above general formula (I) include trihexyl thiophosphate, tri-2-ethylhexyl thiophosphate, tris(decyl) thiophosphate, trilauryl thiophosphate, trimyristyl thiophosphate, tripalmityl thiophosphate, tristearyl thiophosphate, trioleyl thiophosphate, tricresyl thiophosphate, trixylyl thiophosphate, tris(decylphenyl) thiophosphate, and tris[2,4-isoalkyl($C_9$, $C_{10}$)phenyl]thiophosphate. These trihydrocarbyl thiophosphates may be used either alone or in combination of two or more thereof.

In the lubricating oil composition according to the present embodiment, the trihydrocarbyl thiophosphates serving as the component (d-2) are optionally added for the purpose of further enhancing the addition effect of the sulfur compound serving as the component (d-1). An addition amount thereof is preferably 0.1% by mass to 1.0% by mass, and more preferably 0.2% by mass to 0.5% by mass, based on the total amount of the lubricating oil composition.

<(E) Acidic Phosphate Ester Amine Salt>

It is preferred that the lubricating oil composition according to the present embodiment further contains an acidic phosphate ester amine salt as a component (E).

As the acidic phosphate ester amine salt (E), those obtained by reacting acidic alkyl phosphate esters having an alkyl group with 6 to 20 carbon atoms, which is a component (e-1), with dialkylamines and/or trialkylamines, which is a component (e-2), in advance may be used. By blending the above components in the lubricating oil composition according to the present embodiment, the acidic phosphate ester amine salt (E) may also be contained.

((e-1) Acidic Alkyl Phosphate Esters)

As the acidic alkyl phosphate esters used as (e-1), a compound represented by the following general formula (II) is preferred.

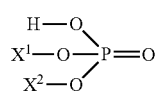

(II)

In the general formula (II), $X^1$ represents a hydrogen atom or an alkyl group having 6 to 20 carbon atoms, and $X^2$ represents an alkyl group having 6 to 20 carbon atoms.

The alkyl group having 6 to 20 carbon atoms may be linear, branched, or cyclic. Examples thereof include various hexyl groups, octyl groups, decyl groups, dodecyl groups, tetradecyl groups, hexadecyl groups, octadecyl groups, and eicosyl groups. Of those, an alkyl group having 10 to 18 carbon atoms is preferred.

Examples of the acidic alkyl phosphate esters represented by the above general formula (II) include: acidic phosphate monoesters, such as monooctyl phosphate, monodecyl phosphate, monoisodecyl phosphate, monolauryl phosphate, mono(tridecyl) phosphate, monomyristyl phosphate, monopalmityl phosphate, and monostearyl phosphate; and acidic phosphate diesters, such as dioctyl phosphate, didecyl phosphate, diisodecyl phosphate, dilauryl phosphate, di(tridecyl) phosphate, dipalmityl phosphate, and distearyl phosphate.

In the present embodiment, the acidic phosphate esters serving as the component (e-1) may be used either alone or in combination of two or more thereof. An addition amount thereof is preferably 0.05% by mass to 1.0% mass, more preferably 0.10% by mass to 0.50% by mass, and still more preferably 0.15% by mass to 0.30% by mass, based on the total amount of the lubricating oil composition. A blending amount thereof is preferably 150 ppm by mass to 500 ppm by mass in terms of the content of all phosphorus atoms in the lubricating oil composition. The content of the phosphorus atoms is more preferably 250 ppm by mass to 450 ppm by mass, and still more preferably 350 ppm by mass to 450 ppm by mass.

((e-2) Dialkylamines and/or Trialkylamines)

The dialkylamines and/or the trialkylamines used as the component (e-2) are preferably those having an alkyl group with 6 to 20 carbon atoms.

Examples of the dialkylamines include dihexylamine, dicyclohexylamine, dioctylamine, dilaurylamine, and distearylamine. Examples of the trialkylamines include trihexylamine, tricyclohexylamine, trioctylamine, trilaurylamine, and tristearylamine.

In the lubricating oil composition according to the present embodiment, the dialkylamines and/or trialkylamines serving as the component (e-2) may be used either alone or in combination of two or more thereof. Of those, trialkylamines are preferred from the viewpoint of further improving seizure resistance. An addition amount thereof is preferably 0.1% by mass to 1.0% by mass, more preferably 0.2% by mass to 0.60% by mass, and still more preferably 0.3% by mass to 0.5% by mass, based on the total amount of the lubricating oil composition.

<Other Additives>

In the lubricating oil composition according to the present embodiment, so long as an object of the present invention is not impaired, lubricating oil additives other than the component (D) and the component (E) are further contained, if desired.

Examples of other lubricating oil additives include a viscosity index improver, a pour point depressant, a metal deactivator, an anti-foaming agent, an ashless detergent dispersant, an antioxidant, a rust inhibitor, a friction modifier, and a demulsifier. Each of these additives independently may be used either alone or in combination of two or more thereof.

Examples of the viscosity index improver include polymethacrylate (PMA), dispersion type polymethacrylate, an olefin-based copolymer (olefin copolymer (OCP); for example, an ethylene-propylene copolymer), a dispersion type olefin copolymer, and a styrene-based copolymer (for example, a styrene-diene hydrogenated copolymer). From the viewpoint of an addition effect, the addition amount of the viscosity index improver is preferably 1% by mass to 10% by mass, and more preferably 2% by mass to 8% by mass, based on the total amount of the lubricating oil composition.

In the lubricating oil composition according to the present embodiment, the viscosity index improver preferably contains at least an olefin copolymer, and the content of the olefin copolymer is preferably 1% by mass to 10% by mass, and more preferably 2% by mass to 8% by mass, based on the total amount of the lubricating oil composition.

Examples of the pour point depressant include an ethylene-vinyl acetate copolymer, a condensate of chlorinated paraffin and naphthalene, a condensate of chlorinated paraffin and phenol, and a polymer such as polymethacrylate and polyalkylstyrene. A weight average molecular weight (Mw) of these polymers is preferably 50,000 to 150,000. From the viewpoint of the addition effect, the content of the pour point depressant is preferably 0.01% by mass to 5.0% by mass, more preferably 0.02% by mass to 2.0% by mass, based on the total amount of the lubricating oil composition.

Examples of the metal deactivator include a benzotriazole-based compound, a tolyltriazole-based compound, a thiadiazole-based compound, an imidazole-based compound, and a pyrimidine-based compound. From the viewpoint of the addition effect, the content of the metal deactivator is preferably 0.01% by mass to 5.0% by mass, and more preferably 0.02% by mass to 3.0% by mass, based on the total amount of the lubricating oil composition.

Examples of the anti-foaming agent include an acrylate-based compound such as silicone oil, fluorosilicone oil, fluoroalkyl ether and polymethacrylate. The content of the anti-foaming agent is preferably 0.01% by mass to 12.0% by mass, more preferably 0.05% by mass to 5.0% by mass, and still more preferably 0.08% by mass to 0.5% by mass, based on the total amount of the lubricating oil composition.

Examples of the ashless detergent dispersant include succinimides, boron-containing succinimides, benzylamines, boron-containing benzylamines, succinate esters, and amides of a mono- or di-valent carboxylic acid represented by a fatty acid or a succinic acid.

From the viewpoint of the addition effect, the content of the ashless detergent dispersant is preferably 0.01% by mass to 5.0% by mass, and more preferably 0.02% by mass to 3.0% by mass, based on the total amount of the lubricating oil composition.

An amine-based antioxidant, a phenol-based antioxidant, a phosphorus-based antioxidant, a sulfur-based antioxidant, and a molybdenum amine complex-based antioxidant, all of which are used in a lubricating oil composition in the related art, may be used as the antioxidant. These antioxidants may be used either alone or in combination of two or more thereof.

Examples of the amine-based antioxidant include: a monoalkyldiphenylamine-based compound, such as monooctyldiphenylamine and monononyldiphenylamine; a dialkyldiphenylamine-based compound, such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine and monobutylphenyl monooctylphenylamine; a polyalkyldiphenylamine-based compound, such as tetrabutyldiphenylamine, tetrahexyldiphenylamine, tetraoctyldiphenylamine, and tetranonyldiphenylamine; and a naphthylamine-based compound, such as α-naphthylamine; phenyl-α-naphthylamine, butylphenyl-α-naphthylamine, pentylphenyl-α-naphthylamine, hexylphenyl-α-naphthylamine, heptylphenyl-α-naphthylamine, octylphenyl-α-naphthylamine, and nonylphenyl-α-naphthylamine.

Examples of the phenol-based antioxidant include: a monophenol-based compound, such as 2,6-di-tert-butyl-4-methylphenol, 2,6-di-tert-butyl 4-ethylphenol, and octadecyl 3-(3,5-di-tert-butyl-4-hydroxyphenyl)propionate; and a diphenol-based compound, such as 4,4'-methylenebis(2,6-di-tert-butylphenol) and 2,2'-methylenebis(4-ethyl-6-tert-butylphenol).

Examples of the phosphorus-based antioxidant include triphenyl phosphite.

Examples of the sulfur-based antioxidant include 2,6-di-tert-butyl-4-(4,6-bis(octylthio)-1,3,5-triazin-2-ylamino)phenol, and a thioterpene-based compound, such as a reaction product of phosphorus pentasulfide and pinene.

As the molybdenum amine complex-based antioxidant, a hexavalent molybdenum compound, specifically, a compound obtained through a reaction between molybdenum trioxide and/or molybdic acid and an amine compound, for example, a compound obtained by a production method described in JP 2003-252887 A may be used.

The content of the antioxidant may be a minimum amount necessary for maintaining the oxidation stability, and is preferably 0.01% by mass to 1.5% by mass, and more preferably 0.1% by mass to 1% by mass, based on the total amount of the lubricating oil composition. When a plurality of types of antioxidants are contained, the total amount is within the above range.

Examples of the rust inhibitor include metal sulfonates, alkylbenzene sulfonates, dinonylnaphthalene sulfonates, organophosphite esters, organophosphate esters, organic sulfonate metal salts, organophosphate metal salts, alkenyl succinate esters, polyhydric alcohol esters, and benzotriazole compounds.

The content of the rust inhibitor is preferably 0.01% by mass to 10.0% by mass, and more preferably 0.05% by mass to 5.0% by mass, based on the total amount of the lubricating oil composition.

Examples of the friction modifier include an ashless friction modifier such as aliphatic amines, aliphatic alcohols, and aliphatic ethers, which have at least one alkyl group or alkenyl group having 6 to 30 carbon atoms in a molecule. The content of the friction modifier is preferably 0.01% by mass to 5.0% by mass based on the total amount of the lubricating oil composition.

Examples of the demulsifier include: cationic surfactants such as quaternary ammonium salts and imidazolines; polyoxyalkylene block polymers (an ethylene oxide (EO)-propylene oxide (PO) block copolymer or the like), polyoxyalkylene glycols and polyoxyalkylene polyglycols; and alkylene oxide adducts of alkylphenol-formaldehyde polycondensates. The content of the demulsifier is preferably 0.001% by mass to 0.5% by mass, and more preferably 0.002% by mass to 0.2% by mass, based on the total amount of the lubricating oil composition.

The 40° C. kinematic viscosity of the lubricating oil composition according to the present embodiment is preferably 200 mm$^2$/s to 500 mm$^2$/s. The 40° C. kinematic viscosity of the lubricating oil composition being 200 mm$^2$/s or more is preferred since an oil film is appropriately formed. The kinematic viscosity being 500 mm$^2$/s or less is preferred since there is no problem in viscous resistance or the like.

The 40° C. kinematic viscosity of the lubricating oil composition is more preferably 250 mm$^2$/s to 450 mm$^2$/s, and still more preferably 300 mm$^2$/s to 400 mm$^2$/s.

The viscosity index of the lubricating oil composition according to the present embodiment is preferably 120 or more, more preferably 130 or more, and still more preferably 140 or more. The upper limit value thereof is not particularly limited, and is, for example, 200.

The flash point of the lubricating oil composition according to the present embodiment is preferably 242° C. or higher, more preferably 244° C. or higher, still more preferably 245° C. or higher, and even still more preferably 246° C. or higher. The upper limit value of the flash point is not particularly limited, and is, for example, 300° C.

The pour point of the lubricating oil composition according to the present embodiment is preferably −30° C. or lower, more preferably −35° C. or lower, and still more preferably −40° C. or lower.

The kinematic viscosity, the viscosity index, the flash point, and the pour point specifically mean values measured by the methods described in Examples.

In one embodiment of the present invention, the total content of the component (A), the component (B), the component (C), the component (D), the component (E), and one or more additives selected from the group consisting of a viscosity index improver, a pour point depressant, a metal deactivator, an anti-foaming agent, an ashless detergent dispersant, an antioxidant, a rust inhibitor, a friction modifiers, and a demulsifier in the lubricating oil composition is preferably 98% by mass or more and 100% by mass or less, more preferably 99% by mass or more and 100% by mass or less, and still more preferably 100% by mass, based on the total amount of the lubricating oil composition.

In one embodiment of the present invention, the lubricating oil composition contains the component (A), the component (B), the component (C), the component (D), the component (E), the viscosity index improver, the metal deactivator, the anti-foaming agent, the ashless detergent dispersant, the antioxidant, the friction modifier, and the demulsifier. The total content of the component (A), the component (B), the component (C), the component (D), the component (E), the viscosity index improver, the metal deactivator, the anti-foaming agent, the ashless detergent dispersant, the antioxidant, the friction modifier, and the demulsifier is preferably 95% by mass or more and 100% by mass or less, more preferably 98% by mass or more and 100% by mass or less, still more preferably 99% by mass or more and 100% by mass or less, and yet still more preferably 100% by mass, based on the total amount of the lubricating oil composition.

<Use of Lubricating Oil Composition>

The lubricating oil composition according to the present invention has a high flash point, is excellent in lubrication characteristics, such as seizure resistance and wear resistance, under low speed, high load, and poor lubrication, and is excellent in oxidation resistance. Thus, the lubricating oil composition according to the present invention may be used as various lubricating oils including a gear oil or a bearing oil, and is particularly suitable as a lubricating oil for use in a planetary gear-type power transmission apparatus in a wind power generator or the like. That is, the lubricating oil composition according to the present embodiment may be suitably used as the wind turbine gear oil composition for wind power generation.

As described above, one embodiment of the present invention relates to a lubrication method for lubricating a planetary gear-type power transmission apparatus using the lubricating oil composition. The planetary gear-type power transmission apparatus is preferably a planetary gear-type power transmission apparatus for use in a wind power generator.

One embodiment of the present invention relates to a planetary gear-type power transmission apparatus using the lubricating oil composition. The planetary gear-type power transmission apparatus is preferably a planetary gear-type power transmission apparatus for use in a wind power generator.

One embodiment of the present invention relates to a speed increaser for wind power generation using the lubricating oil composition.

[Method of Producing Lubricating Oil Composition]

A method for producing a lubricating oil composition according to an embodiment of the present invention includes blending (A) a poly-α-olefin base oil obtained by using a metallocene catalyst, (B) a mineral oil-based base oil which exhibits a distillation curve with a temperature gradient Δ|Dt| of distillation temperature between two points 2.0 vol % and 5.0 vol % of distillation amount being 6.8° C./vol % or less, and (C) an ester-based base oil in an amount of 6% by mass or more based on a total amount of the composition.

The lubricating oil composition obtained by the production method is the same as the lubricating oil composition described above, and preferred embodiments thereof are also the same. The component (A), the component (B), and the component (C) blended in the lubricating oil composition are also the same as described above, and preferred embodiments thereof are also the same as described above.

Furthermore, the sulfur compound, which is the component (D), the acidic phosphate ester amine salt, which is the component (E), and other additives, which may be blended with the lubricating oil composition, if desired, are also the same as described above, and preferred embodiments thereof are also the same as described above.

The blending amount of each component in the production method is the same as the content of each component contained in the lubricating oil composition, which is one embodiment of the present invention described above, and a suitable content thereof is also the same as described above.

EXAMPLES

Next, the present invention is hereunder described in more detail with reference to Examples, but it should be construed that the present invention is by no means limited to the following Examples.

Properties of the base oil for use in respective Examples and various characteristics of the lubricating oil composition obtained in respective Examples were determined in accordance with the following methods.

[Method of Measuring Various Physical Properties]

(1) Kinematic viscosity and viscosity index

The kinematic viscosity and the viscosity index were measured and calculated in conformity with JIS K 2283:2000.

(2) Distillation temperature at distillation amount of 2.0 vol % and 5.0 vol %

The distillation temperature was measured by distillation gas chromatography in conformity with ASTM D6352.

(3) Paraffin content (% Cp)

The paraffin content was measured in conformity with ASTM D-3238 ring analysis (n-d-M method).

(4) Acid value

The acid value was measured in conformity with JIS K2501:2003 (indicator method).

(5) Pour point

The pour point was measured in conformity with JIS K 2269:1987.

(6) Flash point

The flash point was measured by a cleveland open cup (COC) method in conformity with JIS K 2265-4:2007.

Production Example 1 (Preparation of Component (B): Mineral Oil-Based Base Oil)

A feedstock oil, which was a fraction oil of 200 neutral or more, was subjected to a hydrogenation isomerization dewaxing process, then subjected to a hydrofinishing process, and was thereafter distillated at a distillation temperature at which a 5 vol % fraction of a distillation curve was 460° C. or higher, and fractions having a kinematic viscosity at 40° C. ranging from 19.8 mm$^2$/s to 50.6 mm$^2$/s were collected, so as to prepare a mineral oil-based base oil.

Conditions for the hydrogenation isomerization dewaxing process are as follows.
  Hydrogen gas supply proportion: 300 Nm$^3$ to 400 Nm$^3$ per kiloliter of feedstock oil to be supplied.
  Hydrogen partial pressure: 10 MPa to 15 MPa.
  Liquid hourly space velocity (LHSV): 0.5 hr$^{-1}$ to 1.0 hr$^{-1}$.
  Reaction temperature: 300° C. to 350° C.

Various properties of the obtained mineral oil-based base oil were as follows.
  Distillation temperature at a distillation amount of 2.0 vol %: 451.0° C.
  Distillation temperature at a distillation amount of 5.0 vol %: 464.0° C.
  Temperature gradient Δ|Dt|=4.3° C./vol %
  Kinematic viscosity at 40° C.=43.75 mm$^2$/s
  Viscosity index=143
  Paraffin content (% CP)=94.1

Examples 1 to 4 and Comparative Examples 1 to 8

The following base oils, antioxidants, and various additives were blended in blending amounts shown in Tables 1 and 2, and mixed sufficiently to prepare lubricating oil compositions (X1) to (X4) and (Y1) to (Y8). Details of the various base oils and various additives used are as follows.

<Base Oil>
(Component (A))
  "mPAO-1 (low-viscosity mPAO base oil)": decene oligomer obtained by polymerizing 1-decene using a metallocene catalyst (40° C. kinematic viscosity: 406.1 mm$^2$/s, viscosity index: 185, pour point: less than −50° C.)
  "mPAO-2 (high viscosity mPAO base oil)": decene oligomer obtained by polymerizing 1-decene using a metallocene catalyst (40° C. kinematic viscosity: 1,616 mm$^2$/s, viscosity index: 202, pour point: −37.5° C.)
(Component (B))
  "Mineral oil-based base oil": mineral oil-based base oil prepared in Production Example 1.
(Component (C))
  "Ester-based base oil": ester of trimethylolpropane and isostearic acid (molar ratio 1:2).
(Other Base Oils)
  "PAO-1": poly-α-olefin having a 40° C. kinematic viscosity of 395 mm$^2$/s and a viscosity index of 151.
  "PAO-2": poly-α-olefin having a 40° C. kinematic viscosity of 1,240 mm$^2$/s and a viscosity index of 170.
  "PAO-3": poly-α-olefin mainly composed of C40 and having a 40° C. kinematic viscosity of 28.8 mm$^2$/s, and a viscosity index of 136.

<Additives>
  "Phenol-based antioxidant": octadecyl-3-(3,5-di-t-butyl-4-hydroxyphenyl)propionate
  "Amine-based antioxidant": monobutylphenyl monooctylphenylamine.
  "Dihydrocarbyl sulfide": mixture of di-tert-butyl disulfide and di-tert-butyl trisulfide forms, S content=38.5%.
  "Alkylthiophosphate ester": tris[2,4-isoalkyl($C_9$,$C_{10}$)phenyl]thiophosphate.
  "Alkyl thiocarbamate": methylene bis(dibutyl dithiocarbamate), S content=30.3%.
  "Alkylbenzotriazole": N-dialkylaminomethyl benzotriazole (N=14.6%).
  "Acid phosphate ester-1": isodecyl phosphate.
  "Acid phosphate ester-2": tridecyl phosphate.
  "Alkylamine": trioctylamine.
  "EO-PO copolymer": xylene solution of EO-PO block copolymer (10%)
  "Alkenyl succinimide": mixture of 50% polybutenyl succinimide, 20% polybutene, and 30% mineral oil (base number; 37 mgKOH/g).
  "OCP": ethylene propylene oligomer.
  "Anti-foaming agent-1"; acrylate-based compound having a component concentration of 10% by mass.
  "Anti-foaming agent-2"; acrylate-based compound having a component concentration of 5% by mass.
  "Antifoaming agent-3": silicone-based compound having a component concentration of 10% by mass.

The following tests were performed on each of the prepared lubricating oil compositions (X1) to (X4) and (Y1) to (Y8). The results are shown in Tables 1 and 2 below.

(1) Modified Indiana Oxidation Test (IOT)

A sample oil of 300 mL, as the prepared lubricating oil composition, was charged into a glass tube, a copper coil and an iron coil were wound as a catalyst, a blowing pipe having an outer diameter of 7.0 mm and provided with a diffuser stone at a tip thereof was inserted to make the copper coil and the iron coil immersed in the lubricating oil composition in the glass tube. Then, air was blown from a blowing pipe at an oil temperature of 121° C. and at 10 L/h for 312 hours to perform an oxidation stability test.

With respect to the sample oil after the oxidation test, a change rate in the 40° C. kinematic viscosity and the 100° C. kinematic viscosity and an amount of change in acid value were examined. In conformity with SAE-ARP-785-63, a precipitate in the sample oil of 300 mL after the test was filtered through a Millipore filter, and a sample of the precipitate per 100 mL of the sample oil was calculated as a "millipore value" on mass basis.

(2) Foaming Test

Each sample oil was subjected to a foaming test specified in JIS K 2518 at room temperature (24° C.), and a foam volume was measured immediately after and 10 minutes after the test (sequence I).

(3) FE-8 Bearing Wear Test

A bearing wear amount was measured and evaluated in conformity with DIN 51819-3.

(Experiment Conditions)
  Testing machine: FE8 made by FAG (DIN51819-1)
  Roller bearing material: High-strength brass
  Rotation speed: 7.5 rpm
  Load: 100 kN (2.1 GPa)
  Oil temperature: 80° C.
  Test Time: 80 hours×2 (no oil change)

(Evaluation Method)

An evaluation was made for a total bearing wear amount (mg) of two roller bearings. The result is an average value of two experiments (n=2).

(4) FZG Seizure Test (FZG Shock Test)

In conformity with ISO 14635-1, a test was conducted under conditions of 90° C. (±3° C.), 1,455 rpm (±3% rpm), and a test time of 15 minutes, and the presence or absence of seizure of 14th stage was displayed with the 14th stage as an initial load stage. A pinion torque at the 14th stage was 714.2 Nm. In Tables 1 and 2 below, those in which seizure did not occur in the test were described as "pass" and those in which seizure occurred were described as "fail".

TABLE 1

| | Lubricating oil composition | | Example 1 (X1) | Example 2 (X2) | Example 3 (X3) | Example 4 (X4) |
|---|---|---|---|---|---|---|
| Base oil | mPAO-1 (component (A)) | % by mass | — | — | — | — |
| | mPAO-2 (component (A)) | % by mass | 46.08 | 45.05 | 45.05 | 45.05 |
| | Mineral oil-based base oil (component (B)) | % by mass | 38.13 | 36.16 | 36.16 | 36.13 |
| | Ester based base oil (component (C)) | % by mass | 7.00 | 10.00 | 10.00 | 10.00 |
| | PAO-1 | % by mass | — | — | — | — |
| | PAO-2 | % by mass | — | — | — | — |
| | PAO-3 | % by mass | — | — | — | — |
| Additive | Phenol-based antioxidant | % by mass | 0.50 | 0.50 | 0.50 | 0.50 |
| | Amine-based antioxidant | % by mass | 0.50 | 0.50 | 0.50 | 0.50 |
| | Dihydrocarbyl sulfide | % by mass | 0.30 | 0.30 | 0.30 | 0.30 |
| | Alkylthiophosphate ester | % by mass | 0.40 | 0.40 | 0.40 | 0.40 |
| | Alkyl thiocarbamate | % by mass | 1.30 | 1.30 | 1.30 | 1.30 |
| | Alkylbenzotriazole | % by mass | 0.05 | 0.05 | 0.05 | 0.05 |
| | Acid phosphate ester-1 | % by mass | 0.22 | 0.22 | 0.22 | — |
| | Acid phosphate ester-2 | % by mass | — | — | — | 0.25 |
| | Alkylamine | % by mass | 0.36 | 0.36 | 0.36 | 0.36 |
| | EO-PO copolymer | % by mass | 0.01 | 0.01 | 0.01 | 0.01 |
| | Alkenyl succinimide | % by mass | 0.05 | 0.05 | 0.05 | 0.05 |
| | OCP | % by mass | 5.00 | 5.00 | 5.00 | 5.00 |
| | Anti-foaming agent-1 | % by mass | 0.10 | 0.10 | — | 0.10 |
| | Anti-foaming agent-2 | % by mass | — | — | — | — |
| | Anti-foaming agent-3 | % by mass | — | — | 0.10 | — |
| | Total | % by mass | 100.00 | 100.00 | 100.00 | 100.00 |
| Before various tests | 40° C. kinematic viscosity | mm²/s | 318.6 | 315.4 | 315.4 | 315.5 |
| | 100° C. kinematic viscosity | mm²/s | 39.00 | 38.39 | 38.39 | 38.40 |
| | Viscosity index | | 174 | 173 | 173 | 173 |
| | Acid value | mgKOH/g | 0.62 | 0.56 | 0.56 | 0.55 |
| | Flash point | ° C. | 244 | 246 | 246 | 246 |
| | Pour point | ° C. | −45 | −42.5 | −42.5 | −42.5 |
| After oxidation test | 40° C. kinematic viscosity change rate | % | 2.07 | 2.05 | 2.03 | 2.02 |
| | 100° C. kinematic viscosity change rate | % | 1.97 | 1.95 | 1.93 | 1.92 |
| | Acid value change amount | mgKOH/g | −0.11 | −0.11 | −0.11 | −0.13 |
| | Millipore value | mg/100 ml | 1.5 | 0.8 | 0.8 | 0.5 |
| Foaming test | Immediately after test | ml | 240 | 160 | 0 | 140 |
| | 10 minutes after test | ml | 0 | 0 | 0 | 0 |
| FE-8 test | Roller wear amount | mg | 5 | 8 | 8 | 7 |
| FZG seizure test | 14th stage | | pass | pass | pass | pass |

TABLE 2

| | Lubricating oil composition | | Comparative Example 1 (Y1) | Comparative Example 2 (Y2) | Comparative Example 3 (Y3) | Comparative Example 4 (Y4) |
|---|---|---|---|---|---|---|
| Base oil | mPAO-1 (component (A)) | % by mass | — | — | 74.21 | 71.21 |
| | mPAO-2 (component (A)) | % by mass | — | — | — | — |
| | Mineral oil-based base oil (component (B)) | % by mass | — | — | — | 17.00 |
| | Ester based base oil (component (C)) | % by mass | 10.00 | 3.00 | 3.00 | 3.00 |
| | PAO-1 | % by mass | 86.16 | — | — | — |
| | PAO-2 | % by mass | — | 50.00 | — | — |
| | PAO-3 | % by mass | — | 38.21 | 14.00 | — |
| Additive | Phenol-based antioxidant | % by mass | 0.50 | 0.50 | 0.50 | 0.50 |
| | Amine-based antioxidant | % by mass | 0.50 | 0.50 | 0.50 | 0.50 |
| | Dihydrocarbyl sulfide | % by mass | — | 0.30 | 0.30 | 0.30 |
| | Alkylthiophosphate ester | % by mass | 0.40 | 0.40 | 0.40 | 0.40 |
| | Alkyl thiocarbamate | % by mass | 1.65 | 1.30 | 1.30 | 1.30 |
| | Alkylbenzotriazole | % by mass | 0.05 | 0.05 | 0.05 | 0.05 |

TABLE 2-continued

|  |  |  |  |  |  |  |
|---|---|---|---|---|---|---|
|  | Acid phosphate ester-1 | % by mass | 0.22 | 0.22 | 0.22 | 0.22 |
|  | Acid phosphate ester-2 | % by mass | — | — | — | — |
|  | Alkylamine | % by mass | 0.36 | 0.36 | 0.36 | 0.36 |
|  | EO-PO copolymer | % by mass | 0..01 | 0.01 | 0.01 | 0.01 |
|  | Alkenyl succinimide | % by mass | 0.05 | 0.05 | 0.05 | 0.05 |
|  | OCP | % by mass | — | 5.00 | 5.00 | 5.00 |
|  | Anti-foaming agent-1 | % by mass | — | 0.10 | 0.10 | 0.10 |
|  | Anti-foaming agent-2 | % by mass | 0.10 | — | — | — |
|  | Anti-foaming agent-3 | % by mass | — | — | — | — |
| Total |  | % by mass | 100.00 | 100.00 | 100.00 | 100.00 |
| Before | 40° C. kinematic viscosity | mm$^2$/s | 317.1 | 336.9 | 320.9 | 312.9 |
| various | 100° C. kinematic viscosity | mm$^2$/s | 32.96 | 38.01 | 39.76 | 38.65 |
| tests | Viscosity index |  | 145 | 162 | 177 | 175 |
|  | Acid value | mgKOH/g | 0.71 | 0.55 | 0.59 | 0.59 |
|  | Flash point | ° C. | 250 | 240 | 238 | 252 |
|  | Pour point | ° C. | −42.5 | −50 | Less than −50 | Less than −50 |
| After | 40° C. kinematic viscosity | % | 1.80 | 2.88 | 2.40 | 2.56 |
| oxidation | change rate |  |  |  |  |  |
| test | 100° C. kinematic viscosity | % | 1.40 | 2.08 | 2.56 | 1.56 |
|  | change rate |  |  |  |  |  |
|  | Acid value change amount | mgKOH/g | −0.13 | −0.05 | −0.12 | −0.10 |
|  | Millipore value | mg/100 ml | 1.3 | 18 | 15 | 4.3 |
| Foaming | immediately after | ml | 0 | 0 | More than 450 | More than 450 |
| test | 10 minutes later | ml | 0 | 0 | 0 | 0 |
| FE-8 test | Roller wear amount | mg | 140 | 2 | 6 | 6 |
| FZG seizure test | 14th stage |  | pass | fail | fail | fail |

|  | Lubricating oil composition |  | Comparative Example 5 (Y5) | Comparative Example 6 (Y6) | Comparative Example 7 (Y7) | Comparative Example 8 (Y8) |
|---|---|---|---|---|---|---|
| Base oil | mPAO-1 (component (A)) | % by mass | — | — | — | — |
|  | mPAO-2 (component (A)) | % by mass | 47.42 | 46.78 | — | — |
|  | Mineral oil-based base oil (component (B)) | % by mass | 40.79 | 39.43 | — | — |
|  | Ester based base oil (component (C)) | % by mass | 3.00 | 5.00 | 10.00 | 10.00 |
|  | PAO-1 | % by mass | — | — | 69.80 | — |
|  | PAO-2 | % by mass | — | — | — | 46.00 |
|  | PAO-3 | % by mass | — | — | 11.36 | 34.66 |
| Additive | Phenol-based antioxidant | % by mass | 0.50 | 0.50 | 0.50 | 0.50 |
|  | Amine-based antioxidant | % by mass | 0.50 | 0.50 | 0.50 | 0.50 |
|  | Dihydrocarbyl sulfide | % by mass | 0.30 | 0.30 | — | 0.50 |
|  | Alkylthiophosphate ester | % by mass | 0.40 | 0.40 | 0.40 | 0.40 |
|  | Alkyl thiocarbamate | % by mass | 1.30 | 1.30 | 1.65 | 1.65 |
|  | Alkylbenzotriazole | % by mass | 0.05 | 0.05 | 0.05 | 0.05 |
|  | Acid phosphate ester-1 | % by mass | 0.22 | 0.22 | 0.22 | 0.22 |
|  | Acid phosphate ester-2 | % by mass | — | — | — | — |
|  | Alkylamine | % by mass | 0.36 | 0.36 | 0.36 | 0.36 |
|  | EO-PO copolymer | % by mass | 0.01 | 0.01 | 0.01 | 0.01 |
|  | Alkenyl succinimide | % by mass | 0.05 | 0.05 | 0.05 | 0.05 |
|  | OCP | % by mass | 5.00 | 5.00 | 5.00 | 5.00 |
|  | Anti-foaming agent-1 | % by mass | 0.10 | 0.10 | 0.10 | 0.10 |
|  | Anti-foaming agent-2 | % by mass | — | — | — | — |
|  | Anti-foaming agent-3 | % by mass | — | — | — | — |
| Total |  | % by mass | 100.00 | 100.00 | 100.00 | 100.00 |
| Before | 40° C. kinematic viscosity | mm$^2$/s | 324.7 | 320.9 | 323.6 | 311.0 |
| various | 100° C. kinematic viscosity | mm$^2$/s | 39.79 | 39.29 | 34.80 | 35.05 |
| tests | Viscosity index |  | 175 | 175 | 152 | 158 |
|  | Acid value | mgKOH/g | 0.58 | 0.58 | 0.56 | 0.53 |
|  | Flash point | ° C. | 238 | 242 | 240 | 232 |
|  | Pour point | ° C. | −47.5 | −45 | −45 | −50 |
| After | 40° C. kinematic viscosity | % | 2.09 | 2.04 | 1.89 | 6.01 |
| oxidation | change rate |  |  |  |  |  |
| test | 100° C. kinematic viscosity | % | 1.99 | 2.02 | 1.38 | 6.60 |
|  | change rate |  |  |  |  |  |
|  | Acid value change amount | mgKOH/g | −0.11 | −0.10 | −0.50 | −0.47 |
|  | Millipore value | mg/100 ml | 5.9 | 4.7 | 0 | 0 |
| Foaming | immediately after | ml | 160 | 290 | 0 | 0 |
| test | 10 minutes later | ml | 0 | 0 | 0 | 0 |
| FE-8 test | Roller wear amount | mg | 4 | 4 | 43 | 15 |
| FZG seizure test | 14th stage |  | fail | fail | pass | pass |

It can be said that the lubricating oil compositions (X1) to (X4) prepared in Examples 1 to 4 had a relatively small change in the values of the kinematic viscosity and the acid value even in a long-time oxidation test under a high temperature environment, a small millipore value over a long period of use, a high effect of preventing sludge formation, and a long life, and maintain good oxidation stability. In addition, the roller wear amount and the FZG seizure property in the FE-8 test were also excellent.

On the other hand, in the lubricating oil compositions (Y1) to (Y8) prepared in Comparative Examples 1 to 8, the flash point was low, and the kinematic viscosity change rate, the acid value change amount, the millipore value, and the roller wear amount after the oxidation test were large, causing a problem in the seizure property.

INDUSTRIAL APPLICABILITY

The lubricating oil composition according to the present invention has excellent lubrication characteristics and oxidation stability while maintaining a high flash point, and is thus particularly suitable as a lubricating oil for use in a speed increaser such as a planetary gear-type power transmission apparatus for use in a wind power generator.

The invention claimed is:

1. A lubricating oil composition, consisting of:
   (A) a poly-α-olefin base oil obtained by using a metallocene catalyst;
   (B) a mineral oil-based base oil exhibiting a distillation curve with a temperature gradient Δ|Dt| of distillation temperature between two points 2.0 vol % and 5.0 vol % of distillation amount being 6.8° C./vol % or less;
   (C) an ester-based base oil in an amount of 6% by mass or more based on a total composition mass;
   (D) at least one component (d-1) selected from the group consisting of dihydrocarbyl monosulfide, dihydrocarbyl disulfide, and dihydrocarbyl trisulfide;
   (E) at least one acidic phosphate ester amine salt obtained by reacting one or more acidic alkyl phosphate esters having an alkyl group with 6 to 20 carbon atoms, as component (e-1), with one or more dialkylamine and/or trialkylamine, as component (e-2);
   optionally, at least one base oil selected from the group consisting of mineral oil and synthetic oil, other than the poly-α-olefin base oil (A), the mineral oil-based base oil (B) and the ester-based base oil (C);
   optionally, at least one component (d-2) selected from the group consisting of a sulfurized olefin, thiadiazole compound, dithiocarbamate compound, ester compound having disulfide moiety, sulfurized oil, sulfurized fat, sulfidized fatty acid, dialkyl thiodipropionate, and thioterpene compound;
   optionally, at least one trihydrocarbyl thiophosphate (d-3); and
   optionally, at least one additive selected from the group consisting of a viscosity index improver which is an olefin copolymer, a pour point depressant, a metal deactivator, an anti-foaming agent, an ashless detergent dispersant, an antioxidant, a rust inhibitor, a friction modifier, and a demulsifier;
   wherein the mineral oil-based base oil (B) exhibits a distillation curve with a distillation temperature at which the distillation amount is 2.0 vol % in a range of from 405 to 510° C.,
   wherein the mineral oil-based base oil (B) exhibits a distillation curve with a distillation temperature at which the distillation amount is 5.0 vol % in a range of from 425 to 550° C.,
   wherein the ester-based oil (C) is a partial ester of a polyol, and
   wherein a total amount of the poly-α-olefin base oil (A), the mineral oil-based base oil (B), and the ester-based base oil (C) is 90% by mass or more based on total base oil mass.

2. The composition of claim 1, wherein a total amount of the poly-α-olefin base oil (A) and the mineral oil-based base oil (B) is 75% by mass or more, based on the total composition mass.

3. The composition of claim 1, wherein a content of the poly-α-olefin base oil (A) is 40% by mass or more and 75% by mass or less, based on the total composition mass.

4. The composition of claim 1, wherein a content of the ester-based base oil (C) is 6% by mass or more and 15% by mass or less, based on the total composition mass.

5. The composition of claim 1, wherein a 40° C. kinematic viscosity of the poly-α-olefin base oil (A) is 1,300 mm²/s or more.

6. The composition of claim 1, wherein the poly-α-olefin base oil (A) is a polymer of an α-olefin having 8 to 12 carbon atoms.

7. The composition of claim 6, wherein the poly-α-olefin base oil (A) is a decene oligomer.

8. The composition of claim 1, wherein the partial ester of the polyol has one free hydroxy group.

9. The composition of claim 1,
   wherein the viscosity index improver is present.

10. The composition of claim 9, wherein a content of the olefin copolymer is 1% by mass to 10% by mass, based on the total composition mass.

11. The composition of claim 1, which has a flash point of 242° C. or higher.

12. The composition of claim 1, which is a wind turbine gear oil composition for wind power generation.

13. The composition of claim 1, wherein the partial ester of the polyol comprises more than one free hydroxy group.

14. The composition of claim 1, wherein the amount of the ester-based base oil (C) is of 6% by mass or more and 13% by mass or less, based on the total composition mass.

15. The composition of claim 1, wherein the polyol is neopentyl glycol, trimethylolpropane, glycerin, or a mixture of two or more of any of these.

16. The composition of claim 1, wherein the partial ester is neopentyl glycol monolaurate, neopentyl glycol monomyristate, neopentyl glycol monopalmitate, neopentyl glycol monostearate, neopentyl glycol monoisostearate, trimethylolpropane monolaurate, trimethylolpropane dilaurate, trimethylolpropane monomyristate, trimethylolpropane dimyristate, trimethylolpropane monopalmitate, trimethylolpropane dipalmitate, trimethylolpropane monostearate, trimethylolpropane distearate, trimethylolpropane monoisostearate, trimethylolpropane diisostearate, glycerin mono laurate, glycerin dilaurate, glycerin monostearate, glycerin distearate, glycerin monoisostearate, glycerin diisostearate, or a mixture of two or more of any of these.

17. The composition of claim 1, comprising at least two of the
   acidic phosphate ester amine salt (E).

18. The composition of claim 1, having a 40° C. kinematic viscosity of 200 mm²/s or more and 500 mm²/s or less.

19. The composition of claim 1, wherein the poly-α-olefin base oil (A) is present in an amount of 40% by mass or more and 75% by mass or less, based on the total composition mass, and wherein the mineral oil-based base oil (B) is present in an amount of 10% by mass or more and 60% by mass or less, based on the total composition mass.

20. The composition of claim 16, wherein, based on the total composition mass:

the poly-α-olefin base oil (A) is present in an amount of 45% or more by mass and 70% by mass or less;

the mineral oil-based base oil (B) is present in an amount of 20% by mass or more and 50% or less by mass; and the ester-based base oil (C) is present in an amount of 6% by mass or more and 13% by mass or less, wherein the composition has a kinematic viscosity at 100° C. of at least 38.39 mm$^2$/s and a kinematic viscosity at 40° C. in a range of from 200 to 500 mm$^2$/s.

* * * * *